Nov. 9, 1948. A. H. WESTBERG ET AL 2,453,560
AIRFOIL OPERATING MECHANISM
Filed Sept. 28, 1943 3 Sheets-Sheet 1
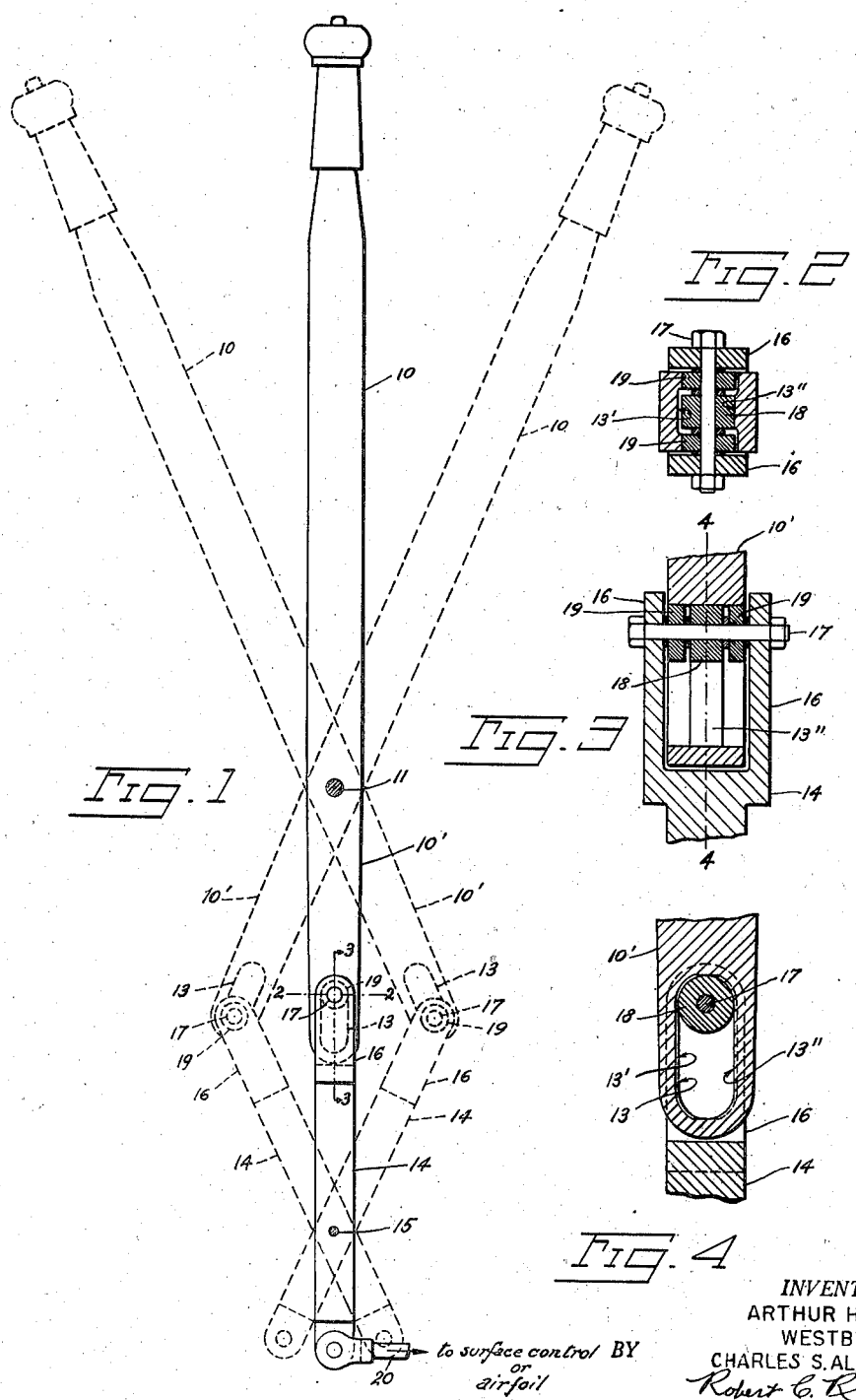
INVENTORS
ARTHUR HAROLD
WESTBERG and
CHARLES S. ALDRICH
Robert C. Rasche,
ATTORNEY

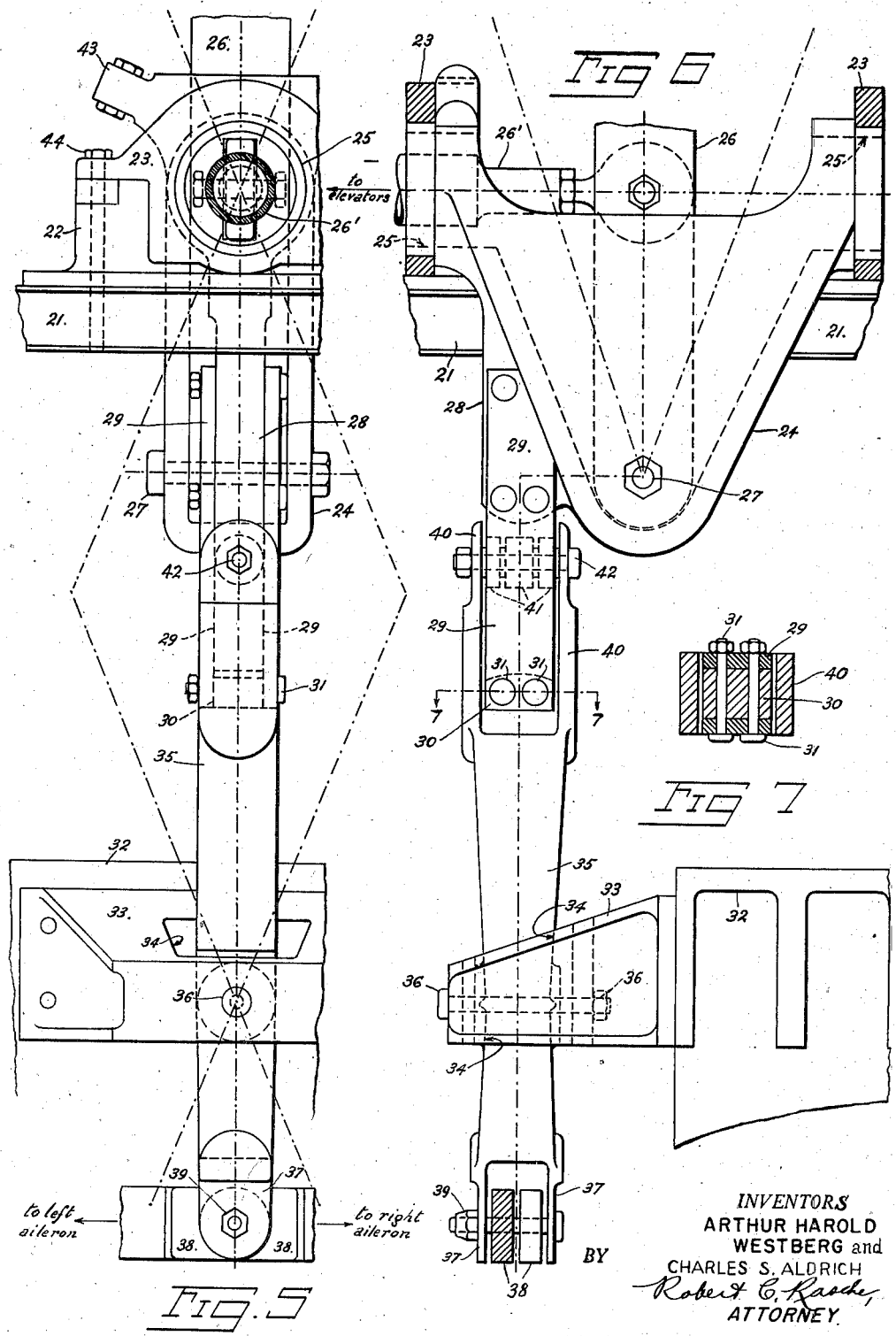

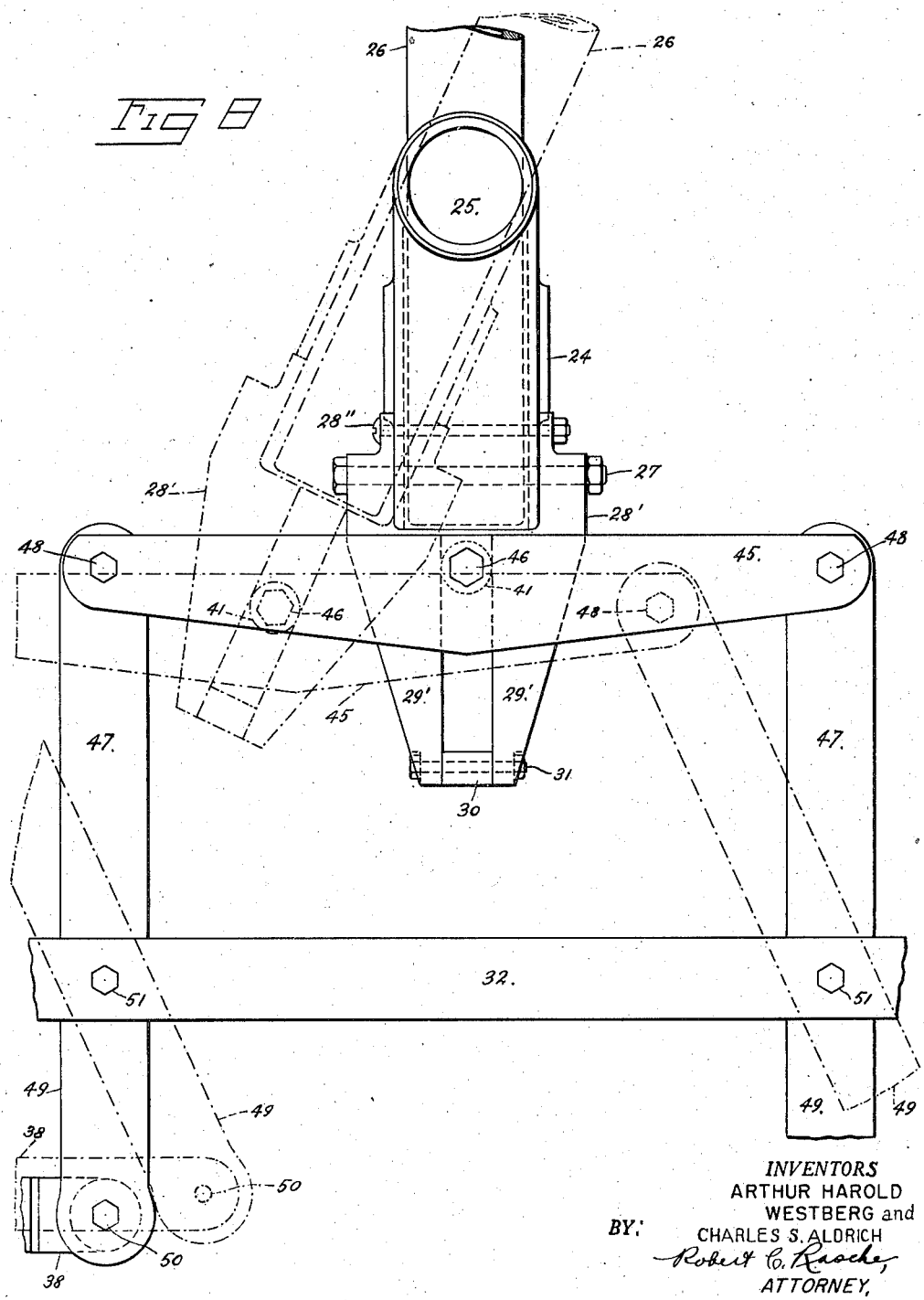

Patented Nov. 9, 1948

2,453,560

UNITED STATES PATENT OFFICE 2,453,560

AIRFOIL OPERATING MECHANISM

Arthur Harold Westberg, Baldwin, and Charles S. Aldrich, Babylon, N. Y., assignors to Republic Aviation Corporation, a corporation of Delaware Application September 28, 1943, Serial No. 504,104

7 Claims. (Cl. 74—516)

This invention relates to aircraft generally, and particularly to the controls for adjusting and operating the airfoils by which the aircraft is maneuvered, or otherwise managed and manipulated.

The present invention proposes an additional mechanical advantage in the operation or adjustment of the air foils of an aircraft, which is most effective when the necessity for such mechanical advantage is the greatest, and decreases or becomes wholly ineffective as the requirements for it lessens or disappears.

The instant invention contemplates a control or operating means for an airfoil of an aircraft having the characteristics above noted, which will be effective at all times without any special adjustment or regulation on the part of the pilot, and which is not dependent for its operation to produce the required additional mechanical advantage on anything beyond the usual and customary manipulation of the control lever, or stick, by the operator.

With the above and other objects in view, as will be apparent, this invention includes the construction, combination and arrangement of parts, all as hereinafter more fully described, claimed and illustrated in the accompanying drawings, but it is to be understood that the invention is limited in the embodiments it can take, only by the scope of the sub-joined claims.

In these drawings,

Fig. 1 is a skeletal elevation of a system of control levers of an aircraft constructed in accordance with the present invention, for cooperation with any type of airfoil or control surface, illustrating in full lines its neutral position and in dotted lines its extreme positions in both directions;

Fig. 2 is an enlarged transverse horizontal section taken along lines 2—2 of Fig. 1;

Fig. 3 is an enlarged vertical section taken along line 3—3 of Fig. 1;

Fig. 4 is a vertical section taken along line 4—4 of Fig. 3;

Fig. 5 is an elevation of a system of control levers of the type illustrated in Fig. 1, but especially altered structurally for the control of ailerons;

Fig. 6 in a view taken at right angle to Fig. 5;

Fig. 7 is a transverse section taken along 7—7 of Fig. 6; and

Fig. 8 is an elevation of a further and modified form of structure embodying the present invention and also applied to the control of ailerons.

The airfoils which control the flight of an aircraft tend to become "frozen," or else, in the absence of opposing forces, to return to their "free-flowing" or ineffective position, in high speed flight, and this tendency increases in direct proportion to the increase in speed. This condition, arising from the aerodynamic forces acting upon the airfoil, increases the force necessary or required to displace the airfoil or airfoils from their "frozen" position or positions. Furthermore, at high speeds, when an airfoil has been adjusted, it frequently becomes necessary to apply an increased force to its control lever to maintain it in its adjusted position.

It is also a well known aerodynamic principle that in high speed flight, where the tendency of the movable airfoil to freeze is greatest, the degree of movement out of the neutral position of the airfoil that is required to accomplish a given maneuver or control of the aircraft is much less than the degree of movement required at slower speeds.

With these fundamentals in view, the present invention proposes to provide an additional mechanical advantage which is effective at its greatest efficiency when the movement of the airfoil from its neutral position is initiated, and as the airfoil proceeds in its movement from its neutral position decreases in its effectiveness. In short, the additional mechanical advantage supplied by this invention is maximum when the airfoil reaches its neutral position and minimum when the airfoil attains its greatest angle of adjustment.

On the other hand, it will be hereinafter apparent that the instant invention can, without departing from the spirit and scope hereof, be so adapted that, conversely, the force applied to the airfoil will increase as it progresses from its neutral position to its position of greatest adjustment, if such a condition is desired.

While the present invention, as applied to the control stick or lever of an aircraft, operates with equal facility for the control and operation of any movable airfoil of the aircraft, either by being embodied in the control stick of the plane or in an independent lever, it is here shown in Figs. 5 to 8 for illustrative purposes only in conjunction with the control of the ailerons.

Fig. 1 skeletally demonstrates the salient features of this invention, regardless of the type of airfoil it controls. In considering the form of the invention illustrated in Fig. 1, it must be remembered that the control stick or lever of an aircraft usually operates and controls two airfoils or two sets of airfoils, viz.: the elevators and the ailerons—the stick manipulating one set of airfoils by its movement in one plane, and the movement of another set of airfoils by its movement in a plane at right angles thereto. In Fig. 1 the structure is illustrated to demonstrate the use of the present invention in the control of one type of airfoil at a time, which—obviously—can be either of said sets, or any other type of airfoil.

In the drawings, 10 designates the control stick or lever of an aircraft, which may of course be any type of lever for any purpose, pivoted to swing about the fixed pivot 11, said lever or stick being in effect a primary lever. When the primary lever or stick 10 is oscillated about the pivot 11, it controls one airfoil or set of airfoils, and incorporates in the control the mechanical advantage resulting from the embodiment of the present invention in that control.

The lower end of the control stick or primary lever 10 below the pivot or fulcrum 11, i. e. the work arm 10' of the lever 10, is provided with a longitudinal slot 13. This slotted end 13 of the work arm 10' connects this primary lever 10 by means of rollers to be hereinafter more fully described, to a secondary lever 14, medially pivoted as at 15 to a stationary part of the fuselage (not shown). It is to be noted that the pivot 11 is likewise fixed to a stationary part of the fuselage. Thus, the movement of the primary or control lever and of the secondary lever 14 is about their fixed pivots, 11—15, which have no relative movement.

The upper end of the secondary lever 14 is bifurcated to create arms 16, which, as illustrated, particularly in Fig. 3, are positioned on opposed sides of the extremity of the work arm 10' of the stick or lever 10. A bolt or pivot pin 17 pierces the arms 16 of the bifurcated end of the secondary lever 14 near their extremities, and carries an intermediate roller 18 flanked by a pair of side rollers 19. By reference to Fig. 2 it will be noted that the slot 13 in the work arm 10' of the primary lever 10 is provided along one side with central groove 13' opposed by a central outstanding ridge 13'' on the opposite side of the slot 13. The central roller 18 carried by the extremity of the secondary lever rides against the ridge 13'', while the side rollers 19, positioned on each side of the central roller 18, bear against the ridges created by the groove 13' on the opposite side of the slot 13, thereby creating a rolling, independent and snug cooperative contact between the rollers and both sides of the slot 13 which does not permit of any play in the connection or any backlash from reaction to airfoil movement or flutter. In other words, by having rollers 18—19 operate on a common axis and the roller 18 contact one side only of the slot and the rollers 19 contact only the other side of the slot, rolling movement is possible without play in the connection and the lever 10 permits no flutter of the controlled airfoil.

That end of the secondary lever 14 on the opposite side of the pivot or fulcrum 15 to the bifurcated extremity 16 thereof is connected by the usual push-pull rod 20 to the airfoil under the control of the levers 10—14. This airfoil may be a tab, flap, elevator, aileron, or any movable airfoil, the principle and function of the instant invention being the same, regardless of the surface or airfoil being controlled.

Since the connection between the work arm 10' of the primary lever 10 and the upper extremity of the secondary lever 14 is a sliding and rolling connection, the coextensive alignment of these levers finds the rollers 18—19 at or near the upper end of the slot 13 and at the lower end of the slot 13 when these levers are moved out of alignment to one of their extreme angular positions (shown in dotted lines Fig. 1). Thus the lower end of the slot 13 may act as a stop to limit the downward movement of the rollers therein and to limit the angle of pivotal movement of the levers 10—14 out of their neutral aligned positions in either direction.

The length of the work arm 10' of the primary lever 10 is at all times determined by the distance between the fixed pivot 11 and the shiftable pivot pin 17, and as this distance varies with the angular disposition of the levers, so the length of the work arm 10' varies in direct proportion to the position of the rollers 18 and 19 in the slot 13. Thus, the effective length of the work arm 10' is considerably shorter when the levers 10 and 14 are in neutral or aligned positions than when they are progressing to, or are at, the extremes of their respective paths of movement and angularly disposed one to the other. By this arrangement the greatest mechanical advantage is applied to the secondary lever 14 by the work arm 10' of the control stick or primary lever 10 at the moment when it is most needed, viz.: when the two levers begin to move, or the attempt is made to move them, from their neutral or aligned, coextensive positions and as the lever 10 and its work arm 10' continues the movement around the pivot 11, the length of the work arm increases, thereby reducing the additional mechanical advantage in direct proportion to said increase in length.

By reversing the connection between the work arm 10' and the secondary lever 14, that is, by placing the slot 13 in the upper extremity of the secondary lever 14, and by positioning the rollers 18 and 19 at the extremity of the work arm 10' it is manifest that the results obtained by the structure are reversed and that the mechanical advantage will increase as the levers move from neutral positions toward and to the ends of their paths of movement. Under certain circumstances such a reversal may be desirable and useful and it may be employed without departing from the spirit and scope of the present invention.

Obviously, also, within the scope and spirit of the present invention would be the modification of the system of levers 10—14 in which the power arm and the work arm of the secondary lever 14 would coincide and be situated above the pivot 15. In that case the rod 20 would be attached to the secondary lever 14 between the fork 16 and said pivot 15. Such a modification may be required when there is insufficient vertical space in the fuselage for the arrangement shown in Fig. 1.

In Figs. 5, 6 and 7 is illustrated a specific embodiment of the present invention as applied to the controls of the ailerons of an aircraft. In these views, 21 designates the floor of the cockpit which carries the lower bearing 22 and the upper bearings 23 between which is mounted the trunnions 25 of a cradle 24. The control stick or lever 26 is pivoted as at 27 to the cradle 24 below the plane of the floor 21 of the cockpit. Above the floor 21 the stick or lever 26 is connected to the push-pull rod 26' which reciprocates through one of the trunnions 25 of the cradle 24 to extend to and operate the elevators.

The ailerons are manipulated by the movement of the control stick or lever 26 and the simultaneous movement of the cradle 24 as a unit on the trunnions 25, i. e. in a plane at right angles to plane of movement of the stick or lever when controlling the elevators. Below the floor 21, the work arm 28 of the stick or primary lever 26—28 is secured to, or integral with, the cradle 24 for movement with it as it swings on the trunnions 25 as above described. The lower end of the arm 28 has the effect of being slotted or bifurcated by fastening two side plates thereto which constitute the opposed spaced tracks 29. These plates or tracks 29, at their free extremities, are joined and held in properly spaced relationship by a block 30 interposed therebetween and secured in place by bolts 31 piercing the block and said extremities of the plates 29. This block 30 constitutes the lower extremity of a slot bounded by the side plates or tracks 29, the block 30 and the lower extremity of the work arm 28 of the primary lever 26—28.

Disposed below and parallel to the floor 21 of the cockpit is a fuselage cross tie 32 spaced from the floor 21. One face of the cross tie 32 has a pivot frame 33 secured thereto, having the aligned slots 34 in the opposed, substantially horizontal sides thereof. A secondary lever 35 operates through the slots 34 and the frame 33 and is designed to swing about a pivot pin 36 carried by the frame 33. The lower end of the secondary lever 35 is bifurcated to create the spaced arms 37 between which the extremities of the push-pull rods 38 are pivotally engaged by means of the bolt 39. These push-pull rods are conventional in construction and extend in opposite directions from the lower extremity of the secondary lever 35, one to the left aileron and one to the right aileron.

At its upper end the secondary lever 35 is also bifurcated to form the spaced arms 40 designed to carry the rollers 41 mounted to rotate upon the pin 42 between the extremities of said arms. These rollers 41 operate in the slot at the lower end of the primary lever 28, defined by the side plates 29 and the block 30 in exactly the same manner as do the rollers 18—19 coact with the slot 13 and its sides, as illustrated in Figs. 1, 2, 3 and 4. The distance between the tracks 29 of the primary lever 26—28 may be accurately adjusted by means of shims inserted between said tracks and the block 30 in order to minimize both friction and play in the sliding connection between the primary lever 26—28 and the secondary lever 35. By tightening the bolts 31, this accurate adjustment may then be attained.

The angular movement of the control stick 26—28 and the cradle 24 about the trunnions 25 is limited by adjustable stops 43 carried by the cradle 24 adjoining one of the trunnions 25 which contact fixed abutments 44 disposed on opposite sides of the trunnion. Thus, one stop 43 contacting the abutment 44 at one end of the horizontal diameter of the trunnion 25 arrests the movement of the control stick 26—28 and cradle 24 in that direction, while the contact between the opposed stop 43 and the opposed abutment 44 arrests the movement of the control stick and cradle in the opposite direction. The abutments 44 are carried by one of the bearings 23 in which the trunnions 25 of the cradle rotate and are disposed at opposed extremities of the horizontal diameter of that bearing.

The operation of this adaptation of the present invention is identical to that disclosed in skeletal form in Fig. 1. As the cradle 24 swings about the trunnions 25 in either direction under the influence of the control stick 26 the former swings the work arm 28 of the primary lever 26—28, the cradle 24 and work arm lever 28 being a rigid unit. In neutral position, the stick or control lever 26, the work arm 28 and the secondary lever 35 are aligned and coextensive, the rollers 41 carried by the secondary lever 35 being then positioned at the upper extremity of the slot formed in the lower end of the work arm 28, i. e. the extremity thereof opposed to the block 30. As the cradle 24 and the lever 26 move or swing in either direction about the trunnions 25, the work arm 28 of the primary lever 26—28, which is that portion thereof between the pin 42 of the rollers 41 and the axis of the trunnions, increases in length as the rollers move in the slot toward the block 30. Because of this, the greatest mechanical advantage occurs just as the levers 28 and 35 leave or are about to leave their coextensive aligned positions to assume positions angularly disposed one to the other and as the degree of the angle between them decreases, so does the mechanical advantage decrease in force.

In Fig. 8 a modification of the present structure is shown which employs a parallel motion. In this form, the control stick 26 is mounted for independent pivotal movement about pivot 27 in the cradle 24 as in Figs. 5, 6 and 7, and the latter is mounted for pivotal movement in a plane perpendicular to the plane of said independent movement about trunnions 25 and carries an extension 28' which projects below the floor (not shown) of the cockpit and which is fastened to the cradle by means of bolts 28''. This extension comprises two spaced plates 29' with a block 30' held between their lower ends by bolts 31. The inner surfaces of the plates 29' are constructed in the same manner as are the inner surfaces of the plates 29 of the work arm 28 in Figs. 5, 6 and 7 and the surfaces of the sides of the slot 13 in the primary lever 10 in the skeletal form shown in Figs. 1, 2 and 3 so as to act as tracks.

A pair of parallel beams 45 is pivotally mounted at 48, on the upper ends of a pair of secondary levers 47. Intermediate of the ends of said beams, a bolt 46 pierces them and constitutes an axle for the rollers 41 operating between the plates 29'. The unitary movement of the stick 26 and cradle 24, as illustrated in dotted lines in Fig. 8, will cause the rollers 41 to move downwardly between the plates 29' toward the block 30, the beams 45 remaining always parallel to each other and to their initial positions during this movement. Parallel to the beams 45 below the floor of the cockpit is the cross tie 32 to which are pivoted the intermediate secondary levers 47, as at 51. The lower extremities 49 of said levers 47 project below the cross tie 32 and are pivotally connected, as at 50, to the aileron push-pull rods 38, the lower extremity of one lever 47 being connected to the push-pull rod 38 of the left aileron, while the lower extremity of the opposite lever 47 is connected to the push-pull rod 38 of the right aileron.

The unitary movement of the stick 26—28' and the cradle 24 about the trunnions 25 in either direction from neutral position forces the rollers 41 downwardly in the space between the plates 29' in the direction of block 30, at the same time maintaining the position of the beams 45 always parallel to themselves. This combined lateral and downward movement of the beams causes the secondary levers 47 to swing about their respective pivots 51 simultaneously and in the same direction pulling one rod 38 and pushing the opposed rod 38. A reversal of this movement causes the elements to move in the opposite direction in exactly the same manner. Thus the swinging movement of the control stick 26 either side from neutral causes a simultaneous bodily movement of the beams 45 laterally and in a vertical plane and the simultaneous swinging of the levers 47 about their pivots 51 in either direction. The secondary levers 47 and the beams 45 together form a parallel motion system carried by the two pivots 51.

In this form of the invention the control lever 26 and the plates 29', defining the slot in which the rollers 41 operate, constitute the primary lever 26—28' while levers 47 constitute the secondary levers. Here two secondary levers 47 are substituted for the one secondary lever 55 shown in Figs. 5, 6 and 7, and the single secondary lever 14, shown in Figs. 1 to 4, inclusive, and at no time are the levers 47, or either of them, coextensive or aligned with the primary lever 26—28'. When the device is in its neutral position, the levers 47 and the lever 26 are parallel one to the other, and normal to the floor 21 of the cockpit and the cross tie 32. When they swing in either direction, the levers 47 assume positions angularly disposed to the control stick 26, exactly as does the single secondary levers 14 in Fig. 2 and the secondary lever 35 in Figs. 5 and 6. With this exception, the structures are substantially identical in arrangement, and regardless of this exception, they are identical in function and results.

The inventive concepts and several illustrative embodiments thereof having been thus disclosed in the manner required by the statutes, what is claimed as new, is:

1. In an airfoil control, the combination with a primary lever, the outer extremity of the work arm of said primary lever having a slot therein, a central longitudinal ridge on one side of said slot, a pair of spaced ridges each at one edge of the other side of said slot, a secondary lever, a plurality of rollers carried by one extremity of the secondary lever and adapted to operate in said slot, a number of said rollers being arranged to contact against the spaced ridges on one side of the slot and the remaining rollers contacting against the central ridge on the opposite side of the slot, and an airfoil connection associated with the opposite end of said secondary lever.

2. In an airfoil control, the combination with a primary lever having a slot in the outer extremity of its work arm, a pair of parallel, spaced ridges on one side of said slot, a central ridge on the opposite side of said slot, a secondary lever, a plurality of rollers operating on a common axis carried at one extremity of said secondary lever, two of said rollers being organized to operate upon the spaced parallel ridges upon one side of the slot and out of contact with the opposed side and the remaining rollers being adapted to operate on the single central ridge of the opposite side of the slot and out of contact with the first side of the slot, and an airfoil connection associated with the opposite end of said secondary lever.

3. The combination with an aircraft control lever having a cradle cooperating with said lever, of an extension of said lever secured to said cradle, said extension having a pair of spaced tracks at one terminal thereof, a secondary lever, a connection between said extension lever and said secondary lever having a sliding connection between the tracks aforesaid, and an airfoil connection associated with the opposite end of said secondary lever.

4. The combination with the control lever of an aircraft, of a cradle cooperating therewith, an extension of said lever fixed to said cradle, a pair of spaced tracks at the outer extremity of said extension, a secondary lever, a connection between one terminal of said secondary lever and said extension lever embodying a plurality of rollers operating upon a common axis between said tracks, a number of said rollers being organized to operate against one of said tracks and the remainder thereof to operate against the other of said tracks, and an airfoil connection associated with the opposite end of said lever.

5. The combination with an aircraft including a movable control surface, of a vertically disposed control lever, a fixed pivotal mounting for said lever situated medially of its length and dividing said lever into an upper power arm and a lower work arm, a vertical secondary lever positioned below said control lever to align vertically with the latter in neutral, a fixed pivotal mounting for said secondary lever situated medially of its length and parallel to the pivotal mounting of the control lever and dividing said secondary lever into an upper power arm and a lower work arm, an operating connection between the work arm of the secondary lever and the movable control surface, and a variable connection between the work arm of the control lever and the power arm of the secondary lever.

6. In an airfoil control, the combination with a primary lever having a slot in the outer extremity of its work arm, a secondary lever, a plurality of rollers carried by one extremity of the secondary lever for operation in said slot, said rollers being so organized that a part thereof contact one side of the slot and the remainder contact the opposite side of said slot, and an airfoil connection associated with that end of said secondary lever opposed to the rollers.

7. The combination with a conventional aircraft control cradle and a control lever pivoted thereto, of an extension of said lever secured to said cradle at one side of the longitudinal axis of the control lever, said extension having a longitudinal slot therein, a secondary lever, a connection between said extension and one end of said secondary lever slideably operating in the slot aforesaid, and an airfoil connection associated with the opposite end of said secondary lever.

ARTHUR HAROLD WESTBERG.
CHARLES S. ALDRICH.

REFERENCES CITED

The following references are of record in the file of this patent:

UNITED STATES PATENTS

| Number | Name | Date |
|---|---|---|
| 309,125 | Best | Dec. 9, 1884 |
| 1,134,241 | Spiteri | Apr. 6, 1915 |
| 1,830,878 | Krastel | Nov. 10, 1931 |
| 2,276,702 | Riparbelli et al. | Mar. 17, 1942 |

FOREIGN PATENTS

| Number | Country | Date |
|---|---|---|
| 79,256 | Austria | Dec. 10, 1919 |
| 123,817 | Germany | Sept. 26, 1901 |
| 293,134 | Great Britain | July 2, 1928 |